(12) United States Patent
Goossen (10) Patent No.: US 6,519,073 B1
(45) Date of Patent: Feb. 11, 2003

(54) MICROMECHANICAL MODULATOR AND METHODS FOR FABRICATING THE SAME

(75) Inventor: Keith Wayne Goossen, Aberseen, NJ (US)

(73) Assignees: Lucent Technologies Inc., Murray Hill, NJ (US); Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/480,780

(22) Filed: Jan. 10, 2000

(51) Int. Cl.[7] .............................. G02B 26/00; G02F 1/03
(52) U.S. Cl. .................... 359/290; 359/248; 359/291
(58) Field of Search ........................ 359/290, 248, 359/291, 292, 293, 294, 295, 247, 263, 276

(56) References Cited

U.S. PATENT DOCUMENTS

| | | | |
|---|---|---|---|
| 5,500,761 A | 3/1996 | Goossen et al. | 359/290 |
| 5,654,819 A | 8/1997 | Goossen et al. | 359/291 |
| 5,900,983 A | 5/1999 | Ford et al. | 359/627 |
| 5,943,155 A | 8/1999 | Goossen | 359/247 |
| 5,949,571 A | 9/1999 | Goossen et al. | 359/291 |
| 6,259,550 B1 * | 7/2001 | Gottfried-Gottfried et al. | 359/279 |
| 6,351,329 B1 * | 2/2002 | Greywall | 359/290 |

* cited by examiner

*Primary Examiner*—Georgia Epps
*Assistant Examiner*—Tim Thompson
(74) *Attorney, Agent, or Firm*—Dilworth & Barrese (57) ABSTRACT

A method and apparatus for modulating an optical signal using a micromechanical modulator are disclosed. The modulator comprises a membrane, which includes a first and a second layer, a substrate layer, and a substrate, spaced from the membrane to form an air gap. The layers of the membrane are characterized in that there is a relationship between the refractive indices of the layers and the refractive index of the substrate. The membrane is suspended in a first position over the substrate by a flexible support arrangement. Bias is applied to the membrane and the substrate to create an electrostatic force to move the membrane towards the substrate to a second position. The reflectivity of the device to an optical signal changes as the membrane moves from the first position to the second position, thereby modulating the signal. In a preferred embodiment, the thickness of the first and second layers of the membrane are approximately equal to one-third and one-tenth, respectively, of a wavelength of the optical signal, as measured within the first and second layers, respectively. The thickness of the substrate layer is approximately equal to one-seventh of the wavelength of the optical signal, as measured within the substrate layer.

63 Claims, 8 Drawing Sheets

MICROMECHANICAL MODULATOR AND METHODS FOR FABRICATING THE SAME

BACKGROUND OF THE INVENTION

A. Field of the Invention

The present invention relates generally to optical modulators, and more particularly to surface normal mechanical optical modulators and methods for fabricating the same.

B. Description of the Prior Art

It is desirable in optical wavelength-division-multiplexing networks to have inexpensive light modulators that have high contrast and wide optical bandwidths. In certain cases, such as audio and video transmission, these modulators need only operate at frequencies up to several megahertz.

A modulation device particularly well suited for the above application is a surface normal micromechanical modulator. This device may be described as having a variable air gap defined by two layers of material. Typically, surface normal light modulators operate by changing the amount of light reflected in the surface normal direction, i.e., the direction normal to the substrate surface. This may be achieved by varying the variable air gap, which alters the optical properties of the device.

Compared with other modulation means, such as a laser, micromechanical modulators are limited in terms of modulation frequency. However, the micromechanical modulators are less expensive to implement and are readily fabricated on silicon substrates facilitating integration with silicon based electronics. Further, unlike the typical semiconductor laser, micromechanical modulators operate in a surface normal manner. This is an attractive feature since a device which operates in this manner requires less wafer space than a device, such as a typical semiconductor laser, in which the operating cavity is formed in the plane of the wafer. Many thousands of surface normal modulators may be formed on a single wafer, minimizing cost. Thus, where the operating frequency is limited, the micromechanical modulator may be the modulation device of choice.

One such micromechanical modulator has been described by Aratani et al. in "Process and Design Considerations for Surface Micromachined Beams for a Tuneable Interferometer Array in Silicon," *Proceedings of the IEEE*, Microelectromech Workshop, Ft. Laud., Fla., Feb. 7–10, 1993 at pages 230–35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. The device is said to behave as a Fabry-Perot interferometer wherein, given two mirrors having equal reflectivity, the reflectivity of the device approaches zero at the resonant wavelength of the cavity. As the membrane moves, altering the cavity, the reflectivity of the device rises. The change in reflectivity modulates the optical signal. While a large change in reflectivity is said to be achieved, the optical bandwidth of the optical resonator based modulator is limited. The contrast ratio of such a device falls off sharply as the wavelength of the incident light varies from the resonant wavelength of the device.

A second micromechanical modulator was described by Solgaard et al. in "Deformable Grating Optical Modulator," *Optics Letters*, vol. 17, no. 9, pages 688–90 (1992). This modulator was described as having a reflection phase grating of silicon nitride beams which is coated with metal and suspended over a substrate which is also coated with metal. An air gap separates the grating and substrate. In the absence of a biasing voltage, the path length difference between the light reflected from the grating beams and that reflected from the substrate is equal to the wavelength of the incoming light. These reflections are therefore in phase, and the device reflects the light in the manner of a flat mirror. When a voltage is applied between the beams and the substrate, the beams are brought in contact with the substrate. The total path length difference between the light reflected from the grating beams and that reflected from the substrate changes to one half of the wavelength of the incident light. In this case, the reflections interfere destructively, causing the light to be diffracted.

The deformable grating optical modulator does not achieve a low reflectivity state. Rather, it switches to a diffracting state. In the diffracting state, incident light is scattered into higher-order diffraction modes of the grating, so that the amount of light reflected into the zero order (surface-normal) mode is minimized. Such diffraction may be an undesirable aspect of the deformable grating optical modulator. If the numerical aperture of the incoming fiber or detection system is large enough to pick up the higher order diffraction modes, a degradation in contrast will result. Further, if this device is implemented in a system using arrays of optical beams or fibers, a significant amount of optical crosstalk may be introduced.

Figure 1:
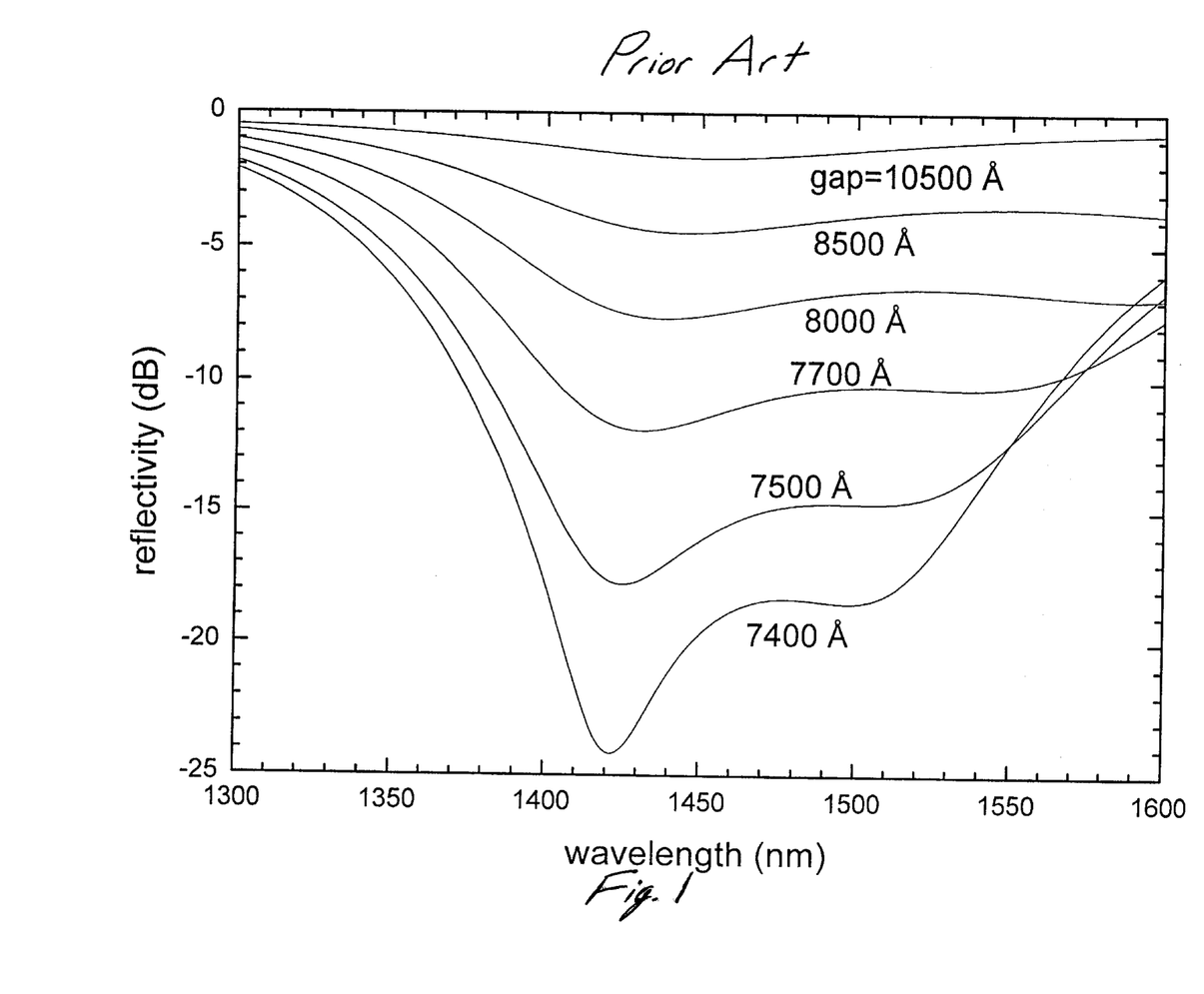
FIG. 1 is a plot of reflectivity versus wavelength of the modulated signal for a modulator according to the prior art.

A plot of reflectivity versus wavelength of the modulated signal for a modulator according to the prior art is shown by FIG. 1. The modulator is centered at approximately 1425 nanometers (nm) for varying thickness of the gap, i.e., from 10500 to 7400 Angstroms (Å). Accordingly, the modulator of the prior art does not provide high contrast modulation for optical signals over a wide range of wavelengths, in particular from 1300 to 1600 nm.

Accordingly, there is a need for an apparatus for modulating an optical signal which provides high contrast modulation for optical signals over a wide range of wavelengths, in particular from 1300 to 1600 nm, and which does not introduce a significant amount of optical crosstalk, and methods for fabricating the same.

SUMMARY OF THE INVENTION

A method and apparatus for modulating an optical signal are disclosed. The apparatus, which may be formed on a semiconductor wafer or chip, comprises a membrane and a substrate, spaced to form an air gap. The membrane consists of two layers, and is suspended over the substrate by support arms. Bias is applied to the membrane and the substrate to create an electrostatic force to move the membrane towards the substrate. The layers of the membrane are characterized in that there is a relationship between the refractive indices of the layers and the refractive index of the substrate.

According to the present invention, the air gap, in the unbiased state, is approximately a multiple of one-quarter of a wavelength of the optical signal. Where the air gap is approximately an odd multiple of one-quarter wavelength, the membrane and air gap function as a high reflectivity coating. Where the air gap is approximately an even multiple of one-quarter wavelength, the membrane and air gap function as an anti-reflection coating. Under the action of bias, the membrane moves through one-quarter of a wavelength to an anti-reflection state or a maximum reflection state depending upon the state of the unbiased membrane. In the embodiments disclosed herein, the membrane does not contact the substrate.

BRIEF DESCRIPTION OF THE DRAWINGS

Further features of the present invention will become more apparent from the following detailed description of specific embodiments thereof when read in conjunction with the accompanying drawings, in which like elements have like reference numerals and in which.

DETAILED DESCRIPTION OF THE PREFERRED EMBODIMENTS

Figure 2:
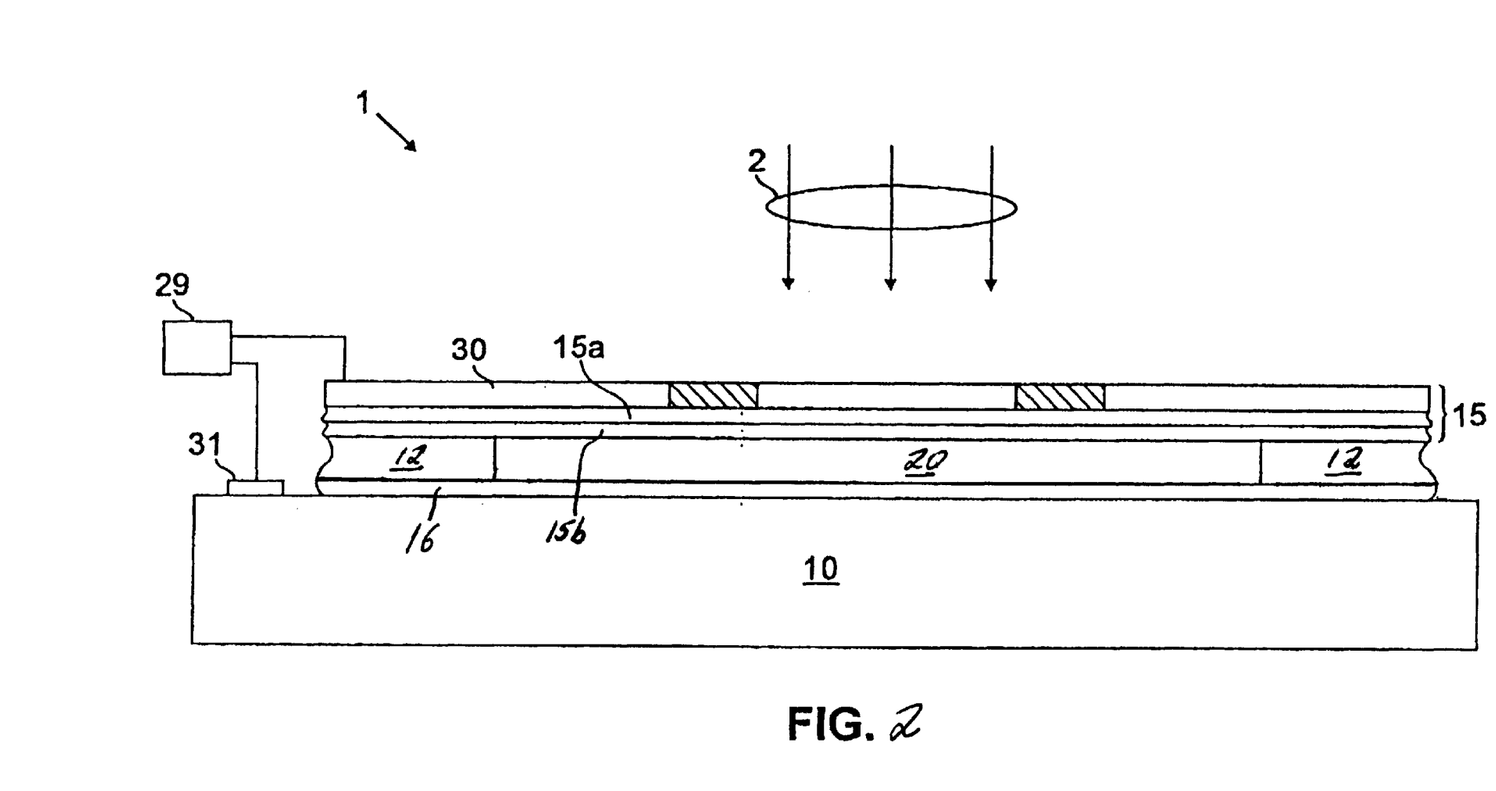
FIG. 2 is a side view of an embodiment of a micromechanical modulator according to the present invention where the modulator is shown in its unbiased position.
Figure 4:
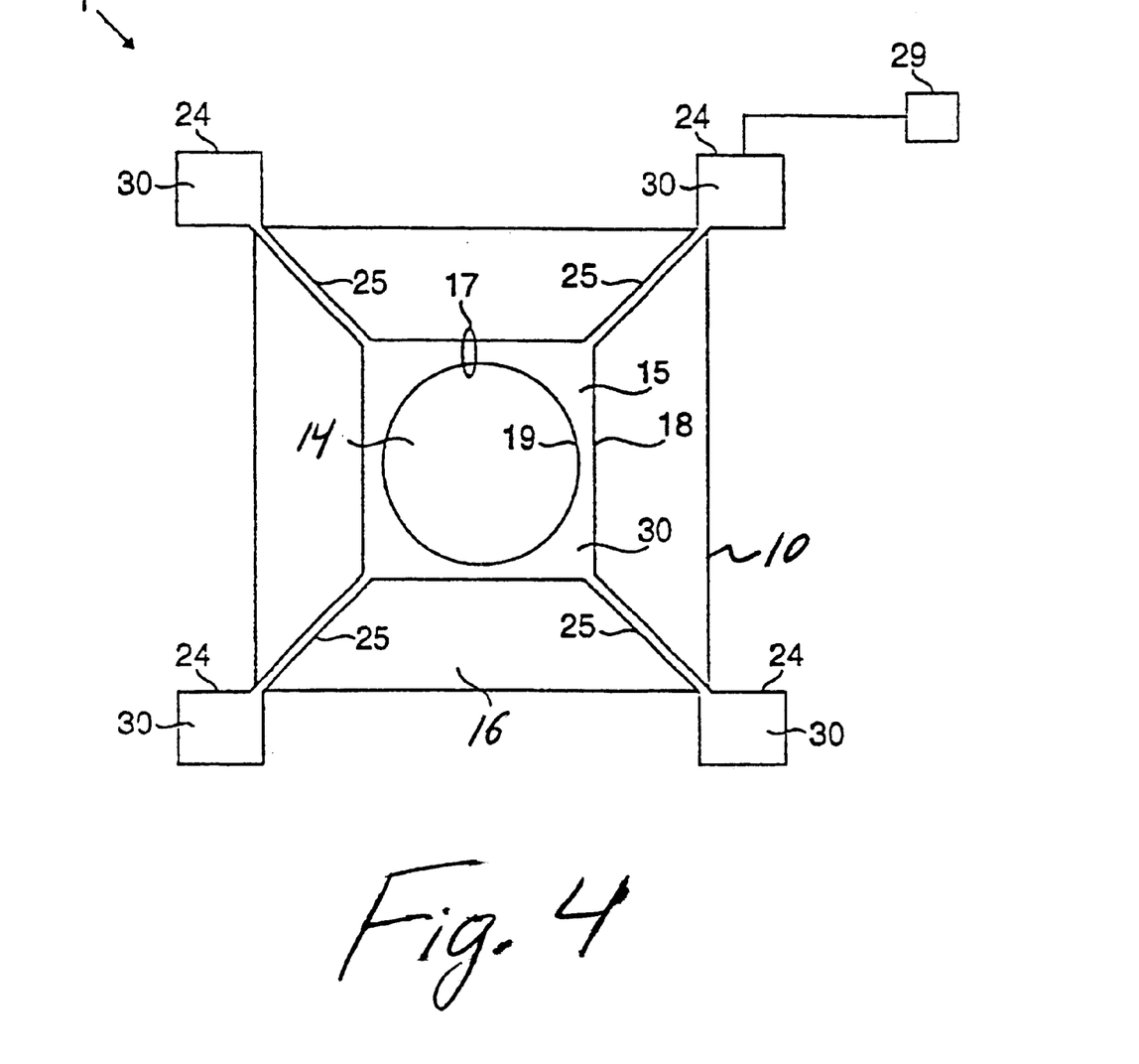
FIG. 4 is a plan view of the micromechanical modulator of FIG. 2.

FIG. 2 shows a first embodiment of a micromechanical modulator 1 according to the present invention. As shown in FIG. 2, the device comprises a substrate 10, a membrane 15 having one or more layers, such as layers 15a, 15b and substrate layer 16 overlaying the substrate 10. The membrane 15 and substrate 10 are spaced from each other, and define an air gap 20 between them. As shown in FIG. 4, the membrane 15 is suspended over the air gap 20 by support arms 25. The membrane 15 may also comprise an electrode 30, and the substrate 10 may also comprise an electrode 31. The electrodes 30 and 31 are provided so that a voltage may be applied across the membrane 15 and the substrate 10 to create an electrostatic force to move the membrane towards the substrate. The device 1 may be suitably formed on a semiconductor chip or wafer.

The substrate 10 may be formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor material is used for the substrate, it should be appropriately doped. Preferably, the substrate is silicon, which should be doped with any Group III or Group V element, typically phosphorus or boron.

The membrane 15 comprises a single optically active layer 15a of material which is characterized by a refractive index which is approximately equal to the square root of the refractive index of the substrate 10. The layer 15a functions as a reflection/anti-reflection layer as will be described below. Suitable materials for the layer 15a include, but are not limited to silicon oxide, or, more preferably, silicon nitride. The membrane 15 also includes a second layer 15b of material which is characterized by a refractive index which is approximately equal to the refractive index of the substrate 10. The layer 15b will typically be formed of the same material as the substrate 10, preferably silicon. If silicon is used for the layer 15b, it may have a polycrystalline structure, such as polysilicon, or it may have an amorphous or single crystal structure.

Figure 3:
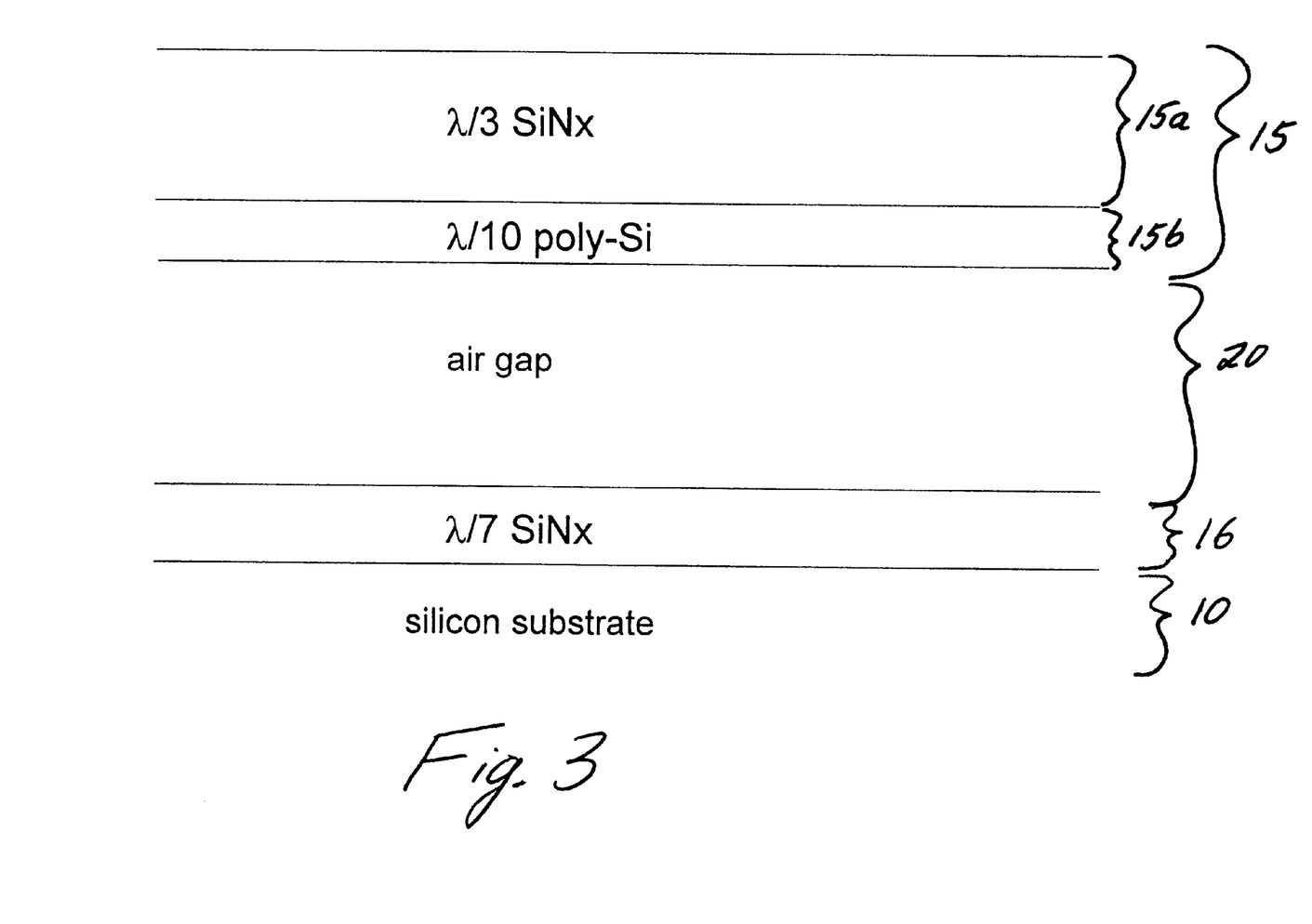
FIG. 3 is a graphical representation of the various layers of the micromechanical modulator according to the present invention.

The thickness of layers 15a, 15b of the membrane 15 in a preferred embodiment is preferably one-third and one-tenth of a wavelength (as measured in the material comprising the layer), respectively, of an incident optical beam 2, as shown by FIG. 3. Where the incident optical beam 2 has a single wavelength, the membrane thickness is readily determined. However, the incident optical beam 2 may be comprised of a number of spectral components of differing wavelengths. For example, the incident optical beam 2 may have a bandwidth extending from 1300 to 1600 nanometers (nm). In such a case, the wavelength selected as the basis (the basis wavelength) for the membrane thickness is determined by selecting the wavelength at the mid-point of the desired bandwidth. Some loss in modulator performance, i.e, contrast, is expected as the wavelength of the spectral components deviates from the basis wavelength.

The height of the air gap 20, i.e, the distance between the membrane 15 and substrate 10, should be approximately a multiple of one-quarter of the basis wavelength in the unbiased position. In other words, the air gap 20 should be approximately $m\lambda/4$, where m is an integer. The substrate layer 16 in the preferred embodiment has a refractive index approximately equal to the square root of the refractive index of the substrate 10 and a thickness of approximately one-seventh of a wavelength of the incident optical beam. Suitable materials for the substrate layer 16 include, but are not limited to conductive materials, such as silicon oxide, or, more preferably, silicon nitride, as shown by FIG. 3, similar to membrane layer 15a. Preferably, during the fabrication process, substrate layer 16 is coated on the substrate 10. The substrate layer 16 serves to decrease the reflectivity of the device, as measured in decibels (dB), when compared to prior art modulators, as illustrated by a comparison of FIGS. 1 and 8, while enabling the device to provide high contrast modulation for optical signals over a wide range of wavelengths, in particular from 1300 to 1600 nm.

The flexible support arms 25, which suspend the membrane 15 above the substrate 10, may be arranged in any convenient manner and may number more or less than four. The flexible support arms 25 serve as a support means for the membrane 15 and also allow the membrane to move relative to the substrate. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material.

Electrodes 30 may comprise a layer of conductive material deposited on the layer 15a. Any suitably conductive material may be used to form the electrodes, including, but not limited to, aluminum, platinum, tungsten, conducting silicon, or, preferably, gold. The electrodes 30 form a continuous conductive layer covering at least a portion of the support arms 25 and the perimeter of the optically active layer 15a forming a border region 17. The electrodes 30 may further include a region 24 extending beyond each support arm 25. Alternatively, the layer 15b of the membrane may be formed from a conductive material so that a separate electrode 30 is not required. An electrode 31 is formed on the substrate 10, as well. The separate electrode 31 is not required if the substrate 10 is suitably conductive. The electrodes, or conducting material if discrete electrodes are not provided, are in electrical contact with a controlled voltage source 29.

With reference to FIG. 4, the inner edge 19 of the border region 17 defines an optical window 14 in the membrane 15. While the optical window 14 is shown to have a circular shape in FIG. 4, the window 14 may have any shape. The size of the optical window will vary with the particular application for which the present invention is used. The optical window 14 must be sized so that the optical "spot" produced by the optical window will be captured by the numerical aperture of the waveguide or other optical device being used in conjunction with the present invention. By minimizing the size of the optical window, the overall membrane size, and hence its mass, may be minimized. This reduction in mass results in a better response time for the modulator.

The micromechanical modulator of FIGS. 2–4 may be formed according to the methods disclosed in U.S. Pat. No. 5,949,571 issued to Goossen et al. on Sep. 7, 1999; U.S. Pat. No. 5,943,155 issued to Goossen on Aug. 24, 1999; U.S. Pat. No. 5,654,819 issued to Goossen et al. on Aug. 5, 1997; and U.S. Pat. No. 5,500,761 issued to Goossen et al. on Mar. 19, 1996. The contents of all these patents are incorporated herein by reference.

Figure 5:
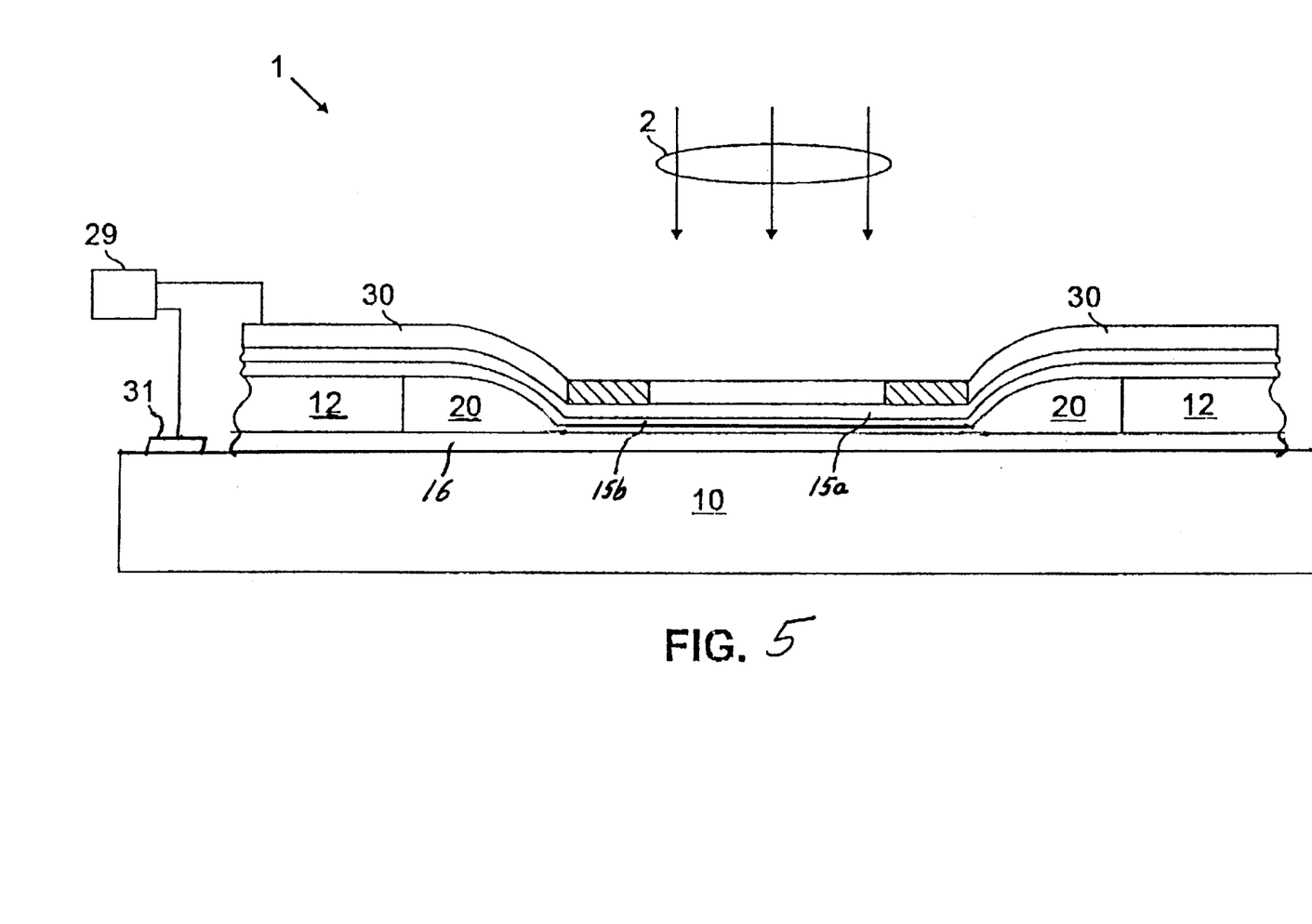
FIG. 5 is a side view of the micromechanical modulator of FIG. 2 under the action of bias.

In operation, the device 1 functions as follows. If the air gap 20, in the unbiased position, is approximately an odd multiple of one-quarter of the basis wavelength, the membrane 15 and air gap 20 function as a high reflection mirror. If the air gap 20 is approximately an even multiple of one-quarter of the basis wavelength, the membrane and air gap serve as a anti-reflection coating for the substrate 10. As an electrical signal, such as a varying voltage, is applied to the electrodes 30 and 31 and in turn from the electrodes 31 to the substrate 10, an electrostatic force is created between the membrane 15 and the substrate 10. This force causes the membrane to move toward the substrate 10, as shown by FIG. 5. As the membrane 15 moves from its unbiased position, the reflectivity of the device changes. As the membrane 15 moves one-quarter of the basis wavelength, a minimum or maximum reflectivity state will be encountered, depending upon the state of the membrane 15 in the unbiased position.

A micromechanical modulator according to the present invention is formed so that the air gap 20, in the unbiased position, is approximately a multiple of one-quarter of the basis wavelength. There are two configurations of the micromechanical modulator. In the first configuration, the air gap 20 is approximately an odd multiple of one-quarter of the basis wavelength in the unbiased position, placing the modulator in a high reflection state. Under the action of bias, the membrane 15 moves approximately through one-quarter of a wavelength to an even multiple of one-quarter of the basis wavelength, placing the modulator in an anti-reflection state. In the second configuration, the air gap 20 is approximately an even multiple of one-quarter of the basis wavelength in the unbiased position, placing the modulator in an anti-reflection state. Under the action of bias, the membrane 15 will move approximately through one-quarter of a wavelength to an odd multiple of one-quarter of the basis wavelength, placing the modulator in a high reflection state. While it is preferred that the membrane 15 move approximately one-quarter of a wavelength under bias, it should be understood that the membrane could move a greater distance. The modulator will cycle-through a maximum and minimum reflectivity state each time the membrane moves a distance of one-quarter of a wavelength.

Figure 6:
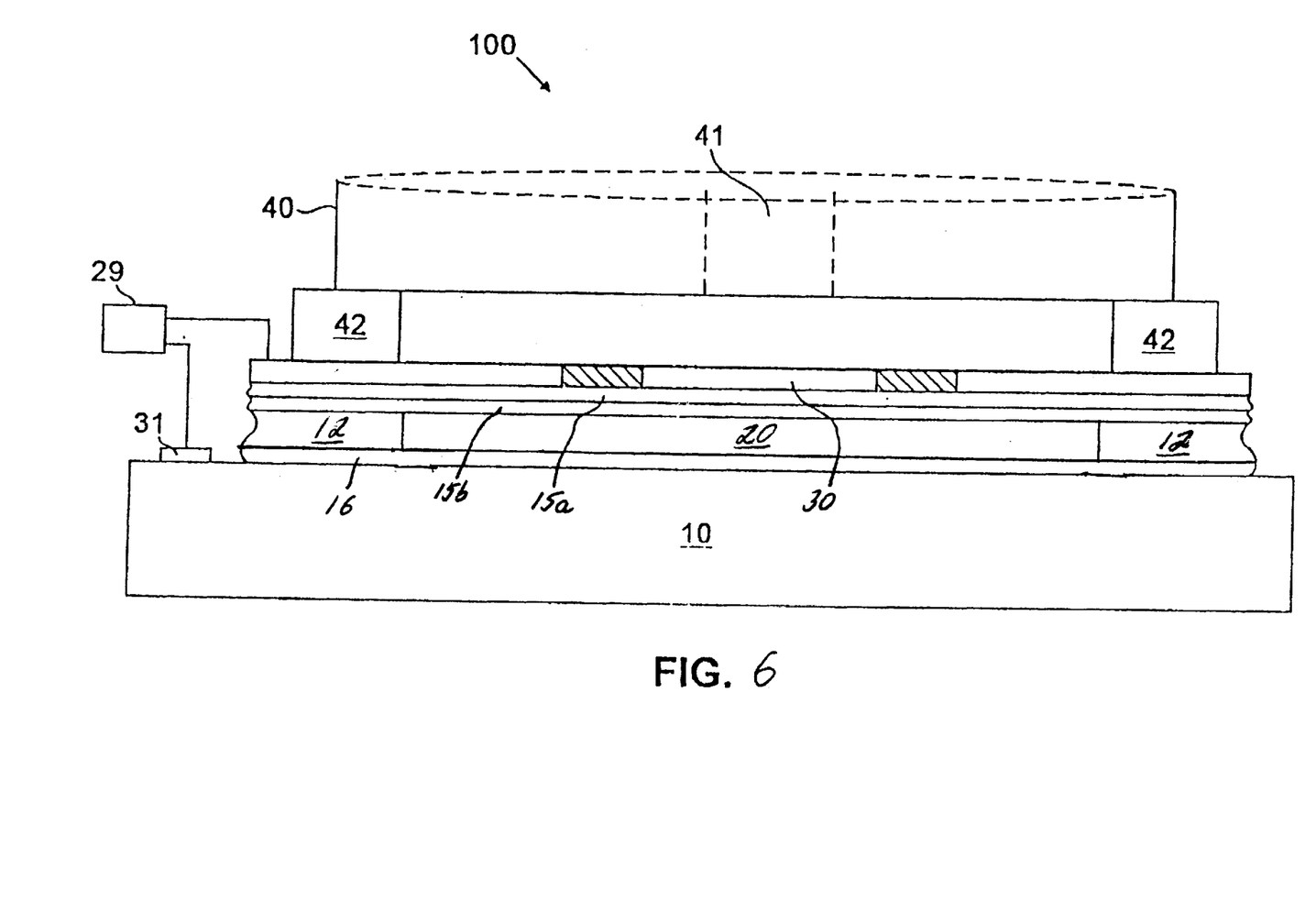
FIG. 6 is a side view of an embodiment of a modulator according to the present invention which incorporates an optical fiber.
Figure 7:
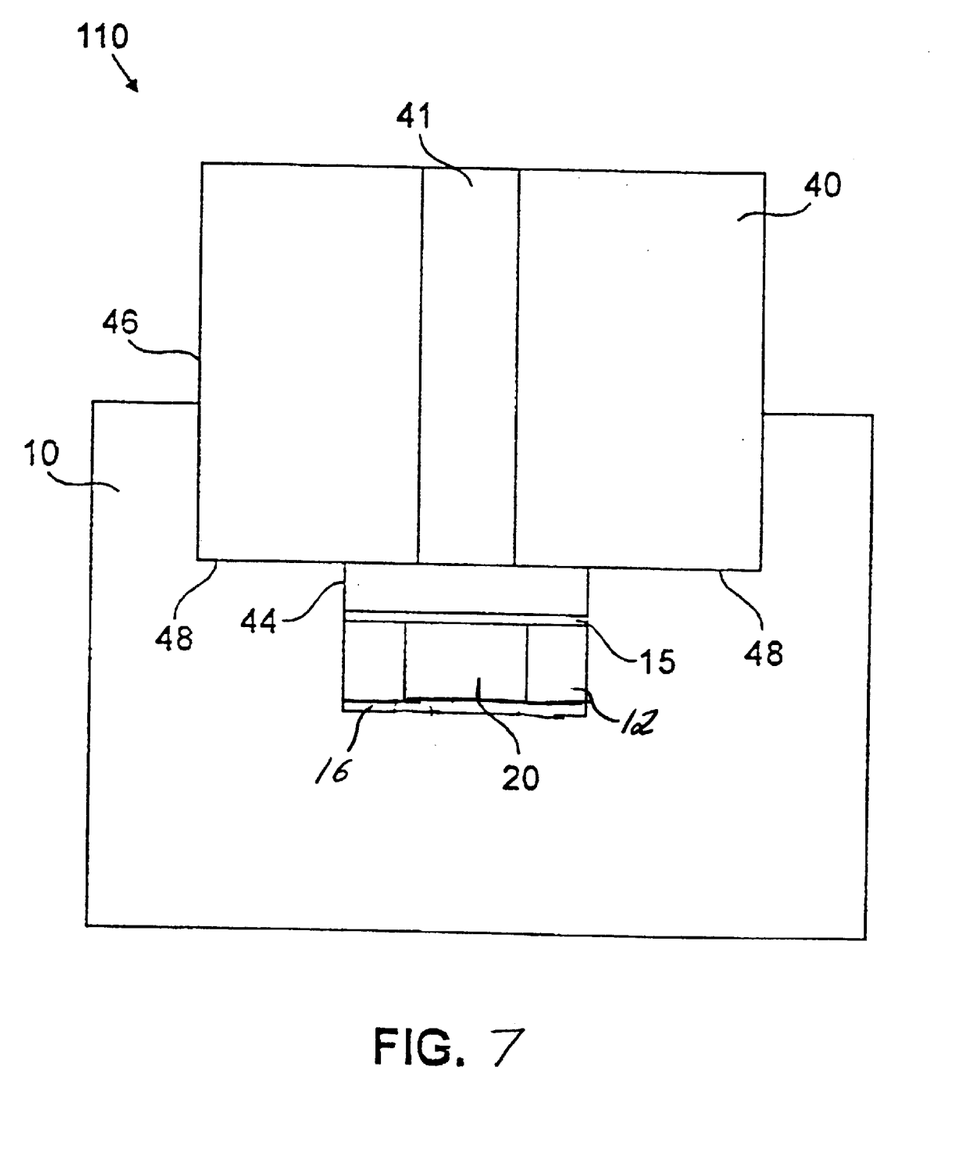
FIG. 7 is a side view of another embodiment of a modulator according to the present invention which incorporates an optical fiber.

In second and third embodiments, illustrated by FIGS. 6 and 7, micromechanical modulators according to the present invention comprise a membrane 15, an air gap 20 and a substrate layer 16, as well as an optical fiber 40 spaced from the membrane 15 to facilitate use in an optical fiber network. In the second embodiment, such a modulator 100 could be fabricated by depositing an electrically insulating material such as silicon dioxide in an annular shape around the modulator 100 to form a support 42 for the fiber 40, as shown in FIG. 6. Epoxy or other adhesive material may be used to cement the fiber 40 to the support 42. The fiber 40 is positioned at approximately an odd or even multiple of one-quarter of the basis wavelength above the top of the unbiased membrane 15. If the fiber is positioned at approximately an odd multiple of one-quarter of the basis wavelength above the unbiased membrane, then the air gap between the unbiased membrane 15 and the substrate 10 must be approximately an odd multiple of one-quarter of the basis wavelength. Similarly, if the fiber is at approximately an even multiple of one-quarter of the basis wavelength above the top of the unbiased membrane 15, then the air gap 20 between the unbiased membrane 15 and the substrate 10 must be approximately an even multiple of one-quarter of the basis wavelength. Preferably, the gap between the fiber 40 and the unbiased membrane 15 is approximately $\lambda/4$. The fiber 40 is positioned so that the optical fiber core 41 is approximately normal to, and in optical communication with, the optical window 14 in the membrane 15.

In the third embodiment of a micromechanical modulator 110 according to the present invention, shown in FIG. 7, two wells, such as wells 44 and 46, are formed in a substrate 10. In well 44, a membrane 15 and an air gap 20 are formed according to methods disclosed in U.S. Pat. No. 5,949,571 issued to Goossen et al. on Sep. 7, 1999; U.S. Pat. No. 5,943,155 issued to Goossen on Aug. 24, 1999; U.S. Pat. No. 5,654,819 issued to Goossen et al. on Aug. 5, 1997; and U.S. Pat. No. 5,500,761 issued to Goossen et al. on Mar. 19, 1996. Well 46 is sized to receive an optical fiber 40. The annular surface 48 created by the formation of the two wells 44, 46 supports the fiber 40 above the membrane 15. As in the second embodiment, the fiber 40 is positioned approximately an odd or even multiple of one-quarter of the basis wavelength above the top of the unbiased membrane 15, with the air gap 20 having a complementary position. Again, the gap between the fiber 40 and the unbiased membrane 15 is approximately $\lambda/4$. Further, the fiber core 41 is approximately normal to, and in optical communication with, the optical window 14 in the membrane 15.

Where the micromechanical modulator includes an optical fiber, such as for the modulators 100 and 110, the optically active layer 15a is characterized by a refractive index which is approximately equal to the square root of the product of the refractive indices of the substrate 10 and the fiber 40. It is contemplated that the micromechanical modulators 100 and 110 may be formed according to the first embodiment wherein the air gap, and gap between the fiber and membrane 15 are approximately a multiple of one-quarter of the basis wavelength and the membrane 15 does not contact the substrate 10 under bias.

It is preferred that modulators according to the present invention are formed and operated so that under the action of bias the membrane 15 moves towards the substrate 10. In other words, the size of the air gap 20 decreases under bias. Alternatively, it is within the contemplated scope of this invention that modulators be formed and operated so that the membrane 15 moves away from the substrate 10 under the action of bias, i.e., the air gap 20 increases. The optical properties of both versions are the same.

Such a modulator may be formed by suspending an electrode, such as a ring of conductive material, above the membrane 15, i.e., on the side of the membrane furthest from the substrate. By applying a bias voltage across the ring and the membrane 15, an electrostatic attraction will be created, moving the membrane 15 toward the ring, and away from the substrate. The electrode is not limited to a ring of conductive material. However, the configuration should be such that the optical signal will pass through the electrode with minimal signal attenuation.

Alternatively, a bias current rather than a voltage, may be supplied to the modulators discussed previously in this specification, such as modulators 1, 100 and 110. The current can be controlled to produce a magnetic repulsion between the membrane 15 and substrate 10 so that the membrane will move away from the substrate under the action of bias.

Figure 8:
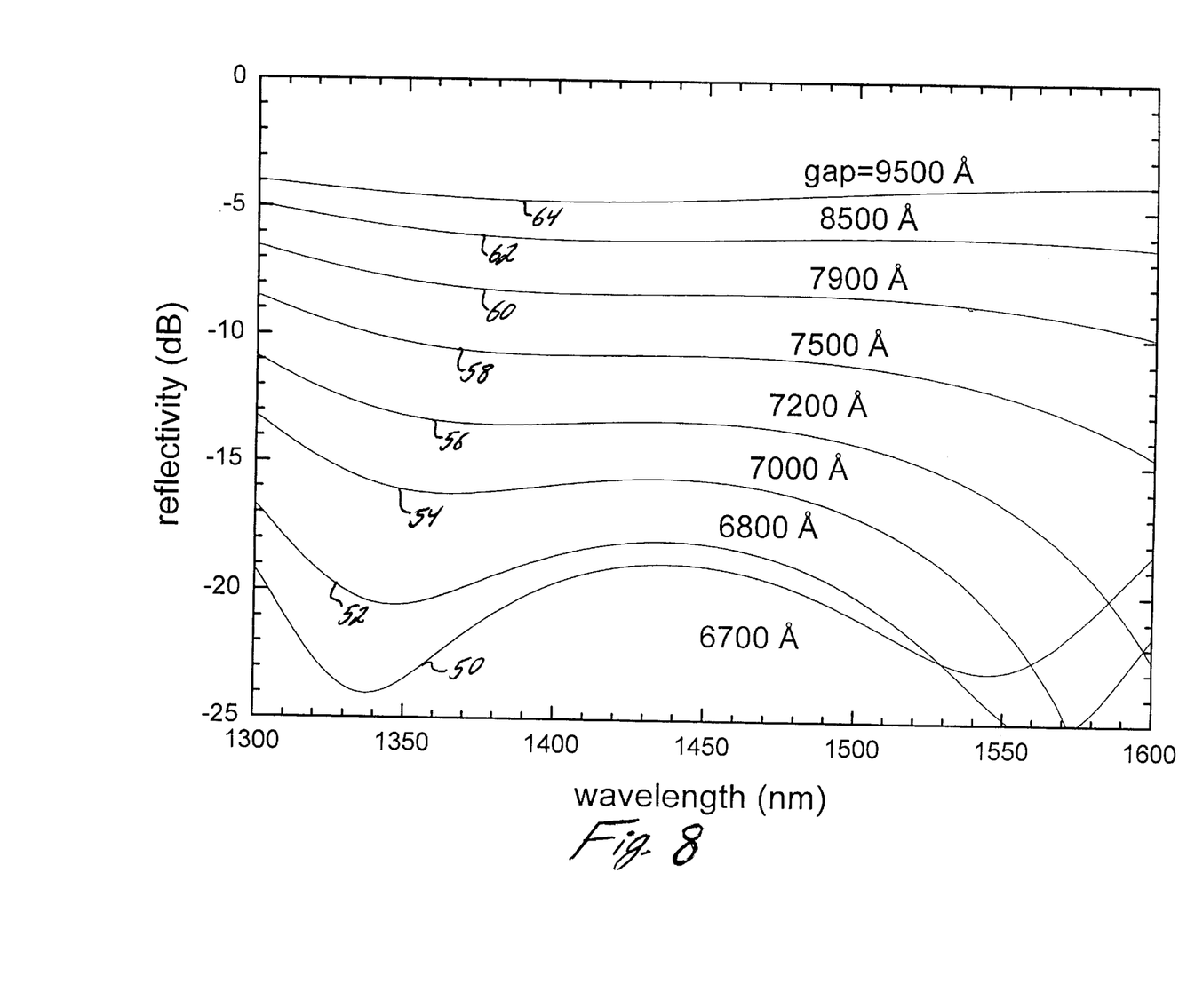
FIG. 8 is a plot of reflectivity versus wavelength of the modulated signal for the micromechanical modulator according to the present invention.

The performance of the modulator of the present invention has been modeled, as illustrated by FIG. 8. FIG. 8 shows the expected performance of a modulator according to the present invention, such as modulator 1, having a double layer membrane 15 and a substrate layer 16. The membrane 15 comprises a silicon nitride layer which is approximately in the range of 2350 to 2470 Angstroms (Å) thick, or preferably, 2417 Å thick, and has a refractive index of approximately 2, and a silicon layer which is approximately in the range of 350 to 450 Å thick, or preferably, 417 Å thick, and has a refractive index of approximately 3.48. The substrate layer 16 is a silicon nitride layer which is approximately in the range of 975 to 1075 Å thick, or preferably, 1036 Å thick, and has a refractive index of approximately 2. The optical signal being modulated is assumed to have a bandwidth extending from 1300 to 1600 nm. Thus, the basis wavelength is 1450 nm.

FIG. 8 shows the reflectivity of the device as a function of wavelength at a number of values for the air gap. An anti-reflection state is shown at reference numerals 50, 52, 54, 56 and 58 which correspond to air gaps of 6700, 6800, 7000, 7200 and 7500 Å, respectively. A maximum reflectivity state is shown at reference numerals 60, 62 and 64, which correspond to air gaps of 7900, 8500 and 9500 Å, respectively.

As shown in FIG. 8, when the air gap is 9500 Å, shown at reference numeral 64, reflectivity is at a maximum of about −4 dB. Only a slight decrease in reflectivity is observed over a bandwidth of 1300 to 1600 nm. When the air gap approaches zero, shown at reference numeral 50, reflectivity is at a minimum of about −20 to −25 dB. This anti-reflection state is maintained even as the wavelength of the modulated signal deviates from the basis wavelength of 1450 nm. While contrast, i.e., the ratio of light reflected in the two states, is at a maximum at the basis wavelength of 1450 nm, there is only a slight decline in contrast over the bandwidth of 1300 to 1600 nm.

Further, with reference to FIG. 8, a modulator according to the present invention, such as modulator 1, may have, for example, an unbiased air gap of 9500 Å, shown at reference numeral 64. Under the action of bias, the membrane 15 will move toward the substrate until the air gap has a value of say 7000 Å, shown at reference numeral 54. Thus, the modulator moves through a high reflection state at reference numeral 64 and an anti-reflection state at reference numeral 54. As the wavelength of the modulated signal deviates from the basis wavelength, contrast declines for the modulator. The same performance is observed in moving from an air gap of 6700 Å, shown at reference numeral 50, to an air gap of 7900 Å, shown at reference numeral 60. FIG. 8 shows that as the air gap increases, the contrast ratio decreases as the wavelength of the modulated light deviates from the basis wavelength. This effect is due to the fact that since the light travels a longer path through the modulator, shifts in the wavelength of the light from the basis wavelength are compounded.

It is contemplated that the micromechanical modulator of the present invention has applicability in variable attenuators, such as the level-setting optical attenuator disclosed in U.S. Pat. No. 5,900,983 issued to Ford et al. on May 4, 1999, the contents of which are incorporated herein by reference, and equalizers designed to operate over the "all-wave" band, i.e., from 1300 to 1600 nm.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A modulator for modulating an optical signal comprising:
    a conductive substrate;
    a conductive membrane comprising at least a first layer of material having a thickness approximately equal to one-third of a wavelength of the optical signal, as measured within the first layer, and a second layer of material having a thickness approximately equal to one-tenth of a wavelength of the optical signal, as measured within the second layer;
    a flexible support for positioning the membrane in a first position wherein the membrane is oriented in spaced and superposed relation to the substrate, defining an air gap which is approximately equal to an integer multiple of one-quarter of a wavelength of the optical signal, as measured in air;
    a substrate layer of material overlaying the conductive substrate and having a thickness approximately equal to one-seventh of the wavelength of the optical signal; and
    a means for supplying bias;
    where, under the action of bias, the membrane moves to a second position, changing the air gap by approximately one-quarter of a wavelength of the optical signal, as measured in air, where the change from the first to the second position causes a change in the amount of the optical signal that is reflected from the membrane.

2. The modulator of claim 1, wherein the first layer has a refractive index which is approximately equal to the square root of the refractive index of the substrate.

3. The modulator of claim 2, wherein the refractive index of the first layer of material is approximately two.

4. The modulator of claim 1, wherein the membrane comprises an optically transparent portion.

5. The modulator of claim 1 where, under the action of bias, the flexible support flexes and the membrane moves toward the substrate.

6. The modulator of claim 1, wherein the conductive substrate is a semiconductor.

7. The modulator of claim 1, wherein the conductive substrate is silicon.

8. The modulator of claim 1, wherein the first layer of material and substrate layer of material are selected from the group consisting of silicon nitride and silicon oxide.

9. The modulator of claim 1, wherein the second layer of material has a refractive index approximately equal to the refractive index of the substrate.

10. The modular of claim 9, wherein the refractive index of the second layer of material is approximately 3.48.

11. The modulator of claim 1, wherein a portion of the membrane defines an optical window for receiving an optical fiber.

12. The modulator of claim 11, wherein the optical window is circular-shaped.

13. The modulator of claim 1, wherein the second layer of material is the same material as the substrate.

14. The modulator of claim 1, wherein the second layer of material is polysilicon.

15. The modulator of claim 1, wherein the integer multiple is one so that the air gap in the first position is approximately equal to one-quarter of a wavelength of the optical signal, as measured in air.

16. The modulator of claim 1, wherein at least a portion of the membrane is coated with a conductive material which is selected from the group consisting of aluminum, gold, platinum, tungsten and conducting silicon.

17. The modulator of claim 1, wherein the second layer of material is conductive.

18. The modulator of claim 1, wherein the flexible support comprises a plurality of flexible support arms.

19. The modulator of claim 18, wherein at least a portion of the flexible support arms are conductive.

20. The modulator of claim 1, further comprising a support for an optical fiber.

21. The modulator of claim 1, wherein the thickness of the first layer of material is approximately in the range of 2350 to 2470 Å.

22. The modulator of claim 1, wherein the thickness of the second layer of material is approximately in the range of 350 to 450 Å.

23. The modulator of claim 1, wherein the thickness of the substrate layer is approximately in the range of 975 to 1075 Å.

24. A modulator for modulating an optical signal comprising:
   a conductive substrate;
   a substrate layer overlaying the conductive substrate having a thickness approximately equal to one-seventh of the wavelength of the optical signal, as measured within the substrate layer;
   an optical fiber having a first end in optical communication with an optically transparent portion of a conductive membrane;
   the conductive membrane having a first and a second surface, where the second surface is closest to the conductive substrate, and comprising an optically active layer having a refractive index which is approximately equal to the square root of the product of the refractive indices of the conductive substrate and the optical fiber, and a thickness approximately equal to one-third of a wavelength of the optical signal, as measured within the optically active layer, the conductive membrane further comprising another layer positioned adjacent the second surface and having a refractive index which is approximately equal to the refractive index of the conductive substrate, and a thickness approximately equal to one-tenth of the wavelength of the optical signal, as measured within the layer; and
   a means for supplying bias, wherein the first end of the optical fiber is in superposed relation to the first surface of the conductive membrane and is spaced from the first surface by approximately an integer multiple of one-quarter of a wavelength of the optical signal, as measured in air, and where the conductive substrate is oriented in superposed relation to the second surface of the conductive membrane and is spaced from the second surface by approximately an integer multiple of one-quarter of a wavelength of the optical signal, as measured in air, where the space between the second surface of the conductive membrane and the conductive substrate defines a first position of the conductive membrane, and where under the action of bias, the conductive membrane moves to a second position, changing the space between the second surface and the conductive substrate by approximately one-quarter of a wavelength of the optical signal, as measured in air, the change from the first to the second position causing a change in the amount of the optical signal that is reflected from the membrane.

25. A device which, under the action of an applied bias, has a variable reflectivity to an incident optical signal received by the device, comprising:
   a substrate;
   a membrane comprising a first and a second layer of material, the first layer having a refractive index which is approximately equal to the square root of the refractive index of the substrate, and the second layer having a refractive index approximately equal to the refractive index of the substrate, the membrane further having an optically transparent portion;
   a substrate layer having a refractive index which is approximately equal to the square root of the refractive index of the substrate; and
   a flexible support for positioning the membrane in a first position wherein the membrane is oriented in spaced and superposed relation to the substrate to form an air gap.

26. The device of claim 25, wherein the substrate is formed of a conductive material.

27. The device of claim 25, wherein the substrate is a semiconductor.

28. The device of claim 25, wherein the substrate is silicon.

29. The device of claim 25, wherein the first layer of material has a thickness approximately equal to one-third of a wavelength of the optical signal, as measured within the first layer.

30. The device of claim 25, wherein the first layer of material is silicon nitride.

31. The device of claim 25, wherein the second layer of material has a thickness approximately equal to one-tenth of a wavelength of the optical signal, as measured within the second layer.

32. The device of claim 25, wherein the substrate layer has a thickness approximately equal to one-seventh of a wavelength of the optical signal, as measured within the second layer.

33. The device of claim 25, wherein the second layer of material is the same material as the substrate.

34. The device of claim 25, wherein the second layer of material is polysilicon.

35. The device of claim 25, wherein in the first position, the air gap is approximately equal to an integer multiple of one-quarter of a wavelength of the optical signal, as measured in air.

36. The device of claim 35, wherein the integer multiple equals one so that the air gap is approximately equal to one-quarter of a wavelength of the optical signal, as measured in air.

37. The device of claim 25, wherein at least a portion of the membrane is conductive.

38. The device of claim 37, wherein the conductive portion of the membrane comprises a layer of conductive material.

39. The device of claim 38, wherein the conductive material is selected from the group consisting of aluminum, gold, platinum, tungsten and conducting silicon.

40. The device of claim 25, wherein the second layer of material is conductive.

41. The device of claim 25, further comprising a means for supplying bias.

42. The device of claim 25, wherein, under the action of bias, the membrane moves to a second position, changing the air gap by approximately one-quarter of a wavelength of the optical signal, as measured in air.

43. The device of claim 42, wherein, in the second position, the air gap is approximately one-quarter of a wavelength of the optical signal, as measured in air, less than the air gap in the first position.

44. The device of claim 25, wherein the flexible support is flexible support arms.

45. The device of claim 25, wherein at least a portion of the flexible support is conductive.

46. The device of claim 44, wherein there are four flexible support arms.

47. The device of claim 25, further comprising a support for an optical fiber.

48. The device of claim 25, wherein the refractive index of the first layer of material is approximately two.

49. The device of claim 25, wherein the refractive index of the second layer of material is approximately 3.48.

50. A device which, under the action of an applied bias, has a variable reflectivity to an incident optical signal received by the device, comprising:
   a substrate coated with a conductive material to a thickness of one-seventh of a wavelength of the optical signal, as measured within the conductive material; and
   an optical fiber having a first end in optical communication with an optically transparent portion of a membrane;
   the membrane having a first and a second surface and comprising a first layer having a thickness of one-third of the wavelength of the optical signal, as measured within the first layer, and a second layer having a thickness of one-tenth of the wavelength of the optical signal, as measured within the second layer;
   wherein the first end of the optical fiber is in superposed and spaced relation to the first surface of the membrane, and where the substrate is oriented in superposed and spaced relation to the second surface of the membrane so that the membrane is positioned between the first end of the optical fiber and the substrate.

51. The device of claim 50, wherein the first layer has a refractive index which is approximately equal to the square root of the product of the refractive indices of the substrate and the optical fiber.

52. The device of claim 50, wherein the space between the optical fiber and the membrane is approximately equal to one-quarter of a wavelength of the optical signal, as measured in air.

53. A method for modulating an optical signal comprising:
   providing a conductive substrate;
   providing a conductive membrane in spaced and superposed relation to the substrate where the membrane comprises a first layer of material having a thickness of one-third of a wavelength of the optical signal, as measured within the first layer, and a second layer of material having a thickness of one-tenth of the wavelength of the optical signal, as measured within the second layer, the membrane further having a first and second position;
   providing a substrate layer on a surface of the conductive substrate closest to the conductive membrane, the substrate layer comprises a material having a thickness of one-seventh of the wavelength of the optical signal, as measured within the conductive material;
   exposing the membrane to an optical signal; and
   applying a bias to move the membrane from the first position to the second position causing the reflectivity of the membrane to change.

54. The method of claim 53, wherein the step of providing a conductive membrane further comprises providing a conductive, flexible support to support the membrane over the substrate.

55. The method of claim 53, wherein the step of providing a membrane further comprises orienting the membrane and substrate so that the space between them is approximately equal to an integer multiple of one-quarter of a wavelength of the optical signal, as measured in air.

56. The method of claim 53, wherein the step of applying a bias to move the membrane from the first position to the second position further comprises decreasing the size of the space between the membrane and the substrate by one-quarter of a wavelength of the optical signal, as measured in air.

57. A method for making a modulator for modulating an optical signal comprising:
   providing a conductive substrate;
   providing a substrate layer of material on the conductive substrate having a thickness of one-tenth of a wavelength of the optical signal, as measured within the substrate layer; and
   forming a conductive membrane on the substrate so that an air gap is defined between the membrane and a portion of the substrate, where the membrane comprises a first layer of material having a thickness of one-third of the wavelength of the optical signal, as measured within the first layer, and a second layer of material having a thickness of one-tenth of the wavelength of the optical signal, as measured within the second layer.

58. The method of claim 57, wherein the step of providing a conductive substrate further comprises appropriately doping a semiconductor.

59. The method of claim 57, wherein the step of forming a membrane further comprises selecting the first layer of material from the group consisting of silicon nitride and silicon oxide.

60. The method of claim 57, wherein the step of forming a membrane further comprises spacing the membrane from the substrate so that the air gap is approximately equal to an integer multiple of one-quarter of the wavelength of the optical signal, as measured in air.

61. A method for making a modulator for modulating an optical signal comprising:

provolving a conductive substrate;

providing a substrate layer of material on the conductive substrate having a thickness of one-tenth of a wavelength of the optical signal, as measured within the substrate layer;

forming a conductive membrane on the substrate so that an air gap is defined between the membrane and a portion of the substrate, where the membrane comprises a first layer of material having a thickness approximately equal to one-third of the wavelength of the optical signal, as measured within the first layer of material, and a refractive index which is approximately equal to the square root of the product of the refractive indices of the substrate and the optical fiber, and a second layer of material having a thickness approximately equal to one-tenth of the wavelength of the optical signal, as measured within the second layer of material;

forming a support to support an optical fiber so that the optical fiber is spaced from the first layer of the membrane by approximately an integer multiple of one-quarter of a wavelength of the optical signal, as measured in air; and attaching the optical fiber to the support.

62. The method of claim 61, wherein the step of forming a membrane further comprises spacing the membrane from the substrate so that the air gap is approximately equal to an integer multiple of one-quarter of a wavelength of the optical signal, as measured in air.

63. The method of claim 61, wherein the step of attaching the optical fiber to the support further comprises orienting the optical fiber so that it is in optical communication with the membrane.

\* \* \* \* \*